United States Patent Office 3,069,388
Patented Dec. 18, 1962

3,069,388
COPOLYMERS OF 3,3,3-TRIFLUOROPROPENE AND VINYL ESTERS
George B. Sterling, Midland, Mich., assignor to The Dow Chemical Company, Midland, Mich., a corporation of Delaware
No Drawing. Filed Dec. 23, 1958, Ser. No. 782,369
4 Claims. (Cl. 260—63)

This invention concerns new copolymers of 3,3,3-trifluoropropene and vinyl esters. It relates more particularly to copolymers containing 3,3,3-trifluoropropene and vinyl esters having the general formula:

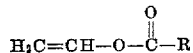

wherein R represents an alkyl radical containing from 1 to 17 carbon atoms, chemically combined in the copolymer molecule and pertains to a method of making the copolymers.

U.S. Patent No. 2,842,529 makes copolymers of 3,3,3-trifluoropropene and halogenated olefins having at least one halogen atom other than fluorine and not more than one fluorine atom in the molecule, e.g. vinyl chloride, vinyl bromide, vinylidene chloride or 1,1-chlorofluoroethylene.

It is an object of the invention to provide new and useful copolymers of 3,3,3-trifluoropropene and vinyl esters. Another object is to provide new copolymers comprising 3,3,3-trifluoropropene and vinyl esters having the above general formula chemically combined in the copolymer molecule which copolymers are readily fabricated into a wide variety of useful end products. A further object is to provide copolymers comprising 3,3,3-trifluoropropene and vinyl esters chemically combined with one or more other monoethylenically unsaturated vinyl or vinylidene compounds which polymers are useful for a variety of purposes. Still another object is to provide a process for making such copolymers. Other and related objects will become apparent from the following description of the invention.

According to the invention the foregoing and related objects are obtained by a process which comprises polymerizing 3,3,3-trifluoropropene in admixture with a vinyl ester having the general formual

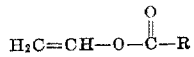

wherein R represents an alkyl radical having from 1 to 17 carbon atoms, and with or without one or more other polymerizable monoethylenically unsaturated vinyl or vinylidene compounds as hereinafter defined.

It may be mentioned that 3,3,3-trifluoropropene readily copolymerizes with vinyl esters of the above general formula and with mixtures of such vinyl esters and other vinyl and vinylidene compounds, but is not readily copolymerized with a number of monoethylenically unsaturated vinyl or vinylidene compounds in the absence of the vinyl esters. The vinyl esters have an action of effecting copolymerization of the 3,3,3-trifluoropropene with vinyl or vinylidene compounds to form polymeric products in which two, three, four or more different monomers are chemically combined in the copolymer molecule.

The copolymerization is preferably effected in the presence of a free radical polymerization catalyst and can be carried out in mass, i.e. in the absence or substantial absence of an inert solvent or liquid medium, or in an aqueous or non-aqueous medium, suitably in mass or an aqueous emulsion of the oil-in-water type wherein the monomers constitute the oil phase. The polymerization can be carried out at temperatures between about 0° and 100° C., preferably from about 5° to 80° C. and at superatmospheric pressure, suitably autogenous pressure of the mixture of the materials at the polymerization temperature employed although higher pressures can be used.

The vinyl esters which are copolymerized with the 3,3,3-trifluoropropene are vinyl esters having the aforementioned general formula. Examples of suitable vinyl esters are vinyl acetate, vinyl proprionate, vinyl butyrate and vinyl stearate. Mixtures of one or more of the vinyl esters with one or more other monoethylenically unsaturated polymerizable vinyl or vinylidene compounds such as esters of acrylic or methacrylic acid, e.g. ethyl acrylate or methyl methacrylate, or monovinyl aromatic compounds such as styrene, vinyltoluene, isopropylstyrene, ar-dichlorostyrene, or ethylene glycol monomethacrylate, methylol acrylamide, methyl isopropenyl ketone or acrylonitrile, wherein the vinyl ester, i.e. the ester of vinyl alcohol and an aliphatic acid, constitutes at least 20 percent by weight of the total monomers initially used. In other words, the monomeric starting materials should consist of from 5 to 60 percent by weight of 3,3,3-trifluoropropene and at least 20 percent by weight of a vinyl ester having the above general formula, the remainder being one or more other monoethylenically unsaturated vinyl or vinylidene compounds. Binary copolymers of the 3,3,3-trifluoropropene and the vinyl esters are preferably prepared from monomer mixtures containing from 5 to 60 percent by weight of 3,3,3-trifluoropropene and from 95 to 40 percent of the vinyl ester. Mixtures of the monomers containing the 3,3,3-trifluoropropene and the vinyl ester, together with one or more other vinyl or vinylidene compounds preferably contain from 5 to 60 percent by weight of 3,3,3-trifluoropropene, at least 20 percent of a vinyl ester of the above formula and from 20 to 75 percent of one or more different vinyl or vinylidene compounds per 100 parts by weight of the polymerizable monomers initially used.

It is important that the mixtures of three, four, five or more of the monomers contain at least 5 percent by weight of the 3,3,3-trifluoropropene and at least 20 percent by weight of the vinyl ester of the above formula in order that the vinyl ester have an appreciable action for effecting the copolymerization of the other monomer with the 3,3,3-trifluoropropene and the vinyl ester to form a final product in which the constituents are interpolymerized or chemically combined in the copolymer molecule.

In practice the copolymers are prepared by polymerizing a mixture of the monomers in various proportions as described above at temperatures between 0° and 100° C., preferably from at 5° to 80° C., in an aqueous emulsion in the presence of a free radical type polymerization catalyst such as sodium persulfate, potassium persulfate, ammonium persulfate, benzoyl peroxide, lauroyl peroxide, di-tert.-butyl peroxide, cumene hydroperoxide, diisopropylbenzene hydroperoxide, tert.-butyl hydroperoxide or the like. The polymerization is preferably carried out in an aqueous emulsion wherein the continuous phase is water containing an emulsifying agent so as to obtain the copolymer in the form of a synthetic latex. Suitable emulsifying agents are sodium lauryl sulfate, dodecylbenzene sulfonic acid, sodium salt, sodium salts of fatty acids and sodium or potassium salts of disproportionated rosin acids. The copolymer is recovered from the latex in usual ways, e.g. by coagulating the latex, separating, washing and drying the copolymer.

The copolymers range from tough rubbery products having good flexibility to hard brittle solid materials which rubbery and solid polymers can be fabricated into a wide variety of useful products. The copolymer is selectively soluble in organic solvents such as ethyl alcohol, toluene, carbon tetrachloride and methyl ethyl ketone, but not necessarily soluble in each of said solvents. The products can be dissolved in a solvent and employed as protective coatings on surfaces which are subjected to contact with various corrosive substances such as gasoline and strong chemical agents. The rubbery copolymer can be compounded with rubber ingredients and cured to form rubber-like products useful for a variety of purposes, e.g. gaskets or sealing compositions. The thermoplastic polymers can be molded to form useful articles such as boxes, tags, labels and the like.

The most useful copolymers of the invention contain between 2 and 50 percent by weight of 3,3,3-trifluoropropene, at least 20 percent by weight of a vinyl ester of the above formula and from 0 to 75 percent of one or more other vinyl or vinylidene compounds chemically combined or interpolymerized in the copolymer molecule per 100 parts by weight of the copolymer.

The following examples illustrate ways in which the principle of the invention has been applied, but are not to be construed as limiting its scope.

EXAMPLE 1

In each of a series of experiments, a mixture of 3,3,3-trifluoropropene boiling at −25° to −23° C. at atmospheric pressure and having a density of 0.9961 at 21.1° C. and vinyl propionate in proportions as stated in the following table was polymerized in an aqueous emulsion employing the recipe—

| Ingredients: | Parts by weight |
|---|---|
| Monomers | 100 |
| Water | 110 |
| Duponol WAQ (fatty alcohol sodium sulfate) | 0.85 |
| $NaHCO_3$ | 1 |
| Potassium persulfate | 0.75 |

The ingredients were placed in a pressure resistant vessel and agitated to effect emulsification, then heated and stirred at a temperature of 60° C. for a period of 48 hours. Thereafter, the pressure was released and the latex removed. The latex was heated to a temperature of about 95° to 100° C. and steam was bubbled therethrough to distill and remove unreacted monomer. Thereafter, the latex was coagulated and the copolymer separated. It was washed with water and dried. The copolymer was analyzed to determine the percent of 3,3,3-trifluoropropene chemically combined therein. It was tested for solubility in several organic solvents. Table I identifies the experiments and gives the percent by weight of 3,3,3-trifluoropropene and vinyl propionate employed in making the same. The table gives the conversion or percent yield of copolymer, based on the monomers initially used, and the percent of 3,3,3-trifluoropropene chemically combined in the copolymer. All of the copolymers were soluble in ethyl alcohol, methyl ethyl ketone, toluene and carbon tetrachloride.

*Table I*

| | Starting Materials | | Copolymer | | |
|---|---|---|---|---|---|
| Run No. | 3,3,3-Trifluoropropene, percent | Vinyl Propionate, percent | Yield, percent | 3,3,3-Trifluoropropene, percent | Remarks |
| 1 | 5 | 95 | 96 | 3 | Soft, rubbery. |
| 2 | 15 | 85 | 96 | 10 | Do. |
| 3 | 25 | 75 | 96 | 25 | Do. |
| 4 | 40 | 60 | 96 | 35.2 | Do. |

EXAMPLE 2

A mixture of 60 percent by weight of 3,3,3-trifluoropropene boiling at −25° to −23° C. at atmospheric pressure and having a density of 0.9961 at 21.1° C. and 40 percent by weight of vinyl propionate was polymerized in an aqueous emulsion employing the recipe—

| Ingredients: | Parts by weight |
|---|---|
| Monomers | 100 |
| Water | 150 |
| Duponol WAQ (fatty alcohol sodium salt) | 0.85 |
| $NaHCO_3$ | 1 |
| $K_2S_2O_8$ | 0.75 |

The ingredients were placed in a pressure resistant vessel and vigorously agitated to effect emulsification, then heated and stirred with mild agitation at a temperature of 60° C. for a time of 42 hours. Thereafter, the pressure was released and the latex removed. The latex was heated to a temperature of about 100° C. and steam bubbled therethrough to distill and remove unreacted monomers. The latex was divided into two portions. A portion of the latex was placed in a petrie dish and dried at room temperature. It formed a tough flexible film. Another portion of the latex was coagulated and the copolymer separated, washed with water and dried. The conversion was 90 percent, based on the monomers initially used. The copolymer was analyzed and found to contain 48.1 percent by weight of 3,3,3-trifluoropropene. It was a transparent rubbery material having good tensile strength and elongation. It was soluble in ethyl alcohol, methyl ethyl ketone, carbon tetrachloride and toluene.

EXAMPLE 3

A mixture of 10 percent by weight of 3,3,3-trifluoropropene, 40 percent of vinyl propionate, 15 percent of ethyl acrylate and 35 percent of ar-di-chlorostyrene was polymerized in an aqueous emulsion employing a procedure and recipe as described in Example 1. The conversion was 95 percent based on the monomers initially used. The copolymer contained 8.3 percent by weight of chemically combined 3,3,3-trifluoropropene. It was a tough thermoplastic polymer. The latex of the copolymer can be dried to form a tough leathery film. The product was soluble in toluene and carbon tetrachloride. It was insoluble in methyl ethyl ketone and ethyl alcohol.

EXAMPLE 4

A mixture of 50 percent by weight of 3,3,3-trifluoropropene and 50 percent of vinyl stearate was copolymerized in an aqueous emulsion employing a procedure and recipe similar to that employed in Example 1, except that the mixture was heated at 60° C. for 42 hours. The conversion was 51 percent based on the monomers initially used. The copolymer contained 25.8 percent by weight of 3,3,3-trifluoropropene. The produce was soluble in toluene and carbon tetrachloride. It was soluble in ethyl alcohol.

EXAMPLE 5

A mixture of 40 percent by weight of 3,3,3-trifluoropropene, 30 percent of vinyl acetate and 30 percent of methyl vinyl propionate was polymerized in an aqueous emulsion employing a procedure and recipe similar to those employed in Example 1, except that the mixture was heated at 60° C. for 47 hours. The conversion was 94 percent based on the monomers initially used. The copolymer contained 35.8 percent by weight of 3,3,3-trifluoropropene chemically combined in the polymeric product. The copolymer was soluble in toluene, carbon tetrachloride and methyl ethyl ketone. It was insoluble in ethyl alcohol.

EXAMPLE 6

A mixture of 40 percent by weight of 3,3,3-trifluoropropene and 60 percent of vinyl acetate was copolymerized in an aqueous emulsion employing a procedure and recipe as described in Example 4. The conversion was 90 percent based on the monomers initially used. The copolymer contained 29.7 percent by weight of chemically combined 3,3,3-trifluoropropene. The copolymer was a hard transparent solid. It was soluble in toluene, carbon tetrachloride, methyl ethyl ketone and ethyl alcohol.

EXAMPLE 7

A mixture of 30 percent by weight of 3,3,3-trifluoropropene, 20 percent of dichlorostyrene, 20 percent of ethyl acrylate, and 30 percent of vinyl propionate was copolymerized in an aqueous emulsion employing a procedure and recipe similar to those employed in Example 1 except that the mixture was heated at 60° C. for 42 hours. The conversion was 91 percent based on the monomers initially used. The copolymer contained 20.9 percent by weight of chemically combined 3,3,3-trifluoropropene. The product was soluble in toluene and carbon tetrachloride. It was insoluble in methyl ethyl ketone.

EXAMPLE 8

A mixture of 40 percent by weight of 3,3,3-trifluoropropene, 20 percent of vinyl propionate, 20 percent of methylol acrylamide and 20 percent of ethylene glycol monomethylmethacrylate was copolymerized in an aqueous emulsion employing a procedure and recipe similar to those employed in Example 1, except that the mixture was heated at a temperature of 60° C. for 48 hours. The conversion was 84 percent based on the monomers initially used. The copolymer contained 23.8 percent by weight of chemically combined 3,3,3-trifluoropropene. The product was a transparent hard solid. It was insoluble in ethyl alcohol, methyl ethyl ketone and carbon tetrachloride.

EXAMPLE 9

A mixture of 5 percent by weight of 3,3,3-trifluoropropene, 75 percent of styrene and 20 percent of vinyl propionate, together with one percent by weight of alpha,alpha-azobis-isobutyronitrile, based on the total weight of the monomers, as polymerization catalyst was placed in a glass ampoule and sealed. The mixture was heated at a temperature of 60° C. for a period of 24 hours. Thereafter, the ampoule was cooled, broken and the product removed. The polymer was recovered by heating the material under vacuum. There was obtained a brittle transparent copolymer in amount corresponding to 60 percent yield based on the weight of the monomers initially used. The copolymer contained 2 percent by weight of chemically combined 3,3,3-trifluoropropene.

I claim:

1. A copolymer of from 2 to 50 percent by weight of 3,3,3-trifluoropropene, at least 20 percent by weight of a vinyl ester having the general formula

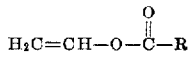

wherein R represents an alkyl radical containing from 1 to 2 carbon atoms, and from 20 to 75 percent of at least one other monoethylenically unsaturated vinylidene compound that is copolymerizable with the vinyl ester, per 100 parts by weight of the copolymer.

2. A copolymer of from 2 to 50 percent by weight of 3,3,3-trifluoropropene, from 20 to 40 percent of a vinyl ester having the general formula

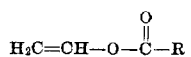

wherein R represents an alkyl radical containing from 1 to 2 carbon atoms, and from 20 to 75 percent of at least one other monoethylenically unsaturated vinylidene compound that is copolymerizable with the vinyl ester, per 100 parts by weight of the copolymer.

3. A copolymer as claimed in claim 2, wherein the vinylidene compound is ethyl acrylate.

4. A copolymer as claimed in claim 2, wherein the vinylidene compound is methyl isopropenyl ketone.

References Cited in the file of this patent
UNITED STATES PATENTS

| | | |
|---|---|---|
| 2,599,640 | Joyce | June 10, 1952 |
| 2,600,684 | Pearson | June 17, 1952 |
| 2,626,252 | Tawnly | Jan. 20, 1953 |
| 2,836,582 | Hoyt | May 27, 1958 |
| 2,842,529 | Bolstad | July 8, 1958 |